United States Patent
Tummala et al.

(10) Patent No.: US 10,662,851 B2
(45) Date of Patent: May 26, 2020

(54) PIPE MIXER FOR AN AFTERTREATMENT SYSTEM

(71) Applicant: Perkins Engines Company Limited, Peterborough (GB)

(72) Inventors: Srikanth Tummala, Peterborough (GB); Xiao Cang, Wuxi (CN)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 16/464,041

(22) PCT Filed: Dec. 8, 2017

(86) PCT No.: PCT/EP2017/082097
§ 371 (c)(1),
(2) Date: May 24, 2019

(87) PCT Pub. No.: WO2018/108755
PCT Pub. Date: Jun. 21, 2018

(65) Prior Publication Data
US 2019/0383194 A1 Dec. 19, 2019

(30) Foreign Application Priority Data
Dec. 14, 2016 (GB) .................... 1621263.1

(51) Int. Cl.
*F01N 3/28* (2006.01)
*B01F 5/06* (2006.01)
(Continued)

(52) U.S. Cl.
CPC ....... *F01N 3/2892* (2013.01); *B01D 53/9431* (2013.01); *B01F 3/04049* (2013.01);
(Continued)

(58) Field of Classification Search
None
See application file for complete search history.

(56) References Cited

U.S. PATENT DOCUMENTS 8,899,022 B2  12/2014  Haverkamp et al.
9,267,413 B2  2/2016  Morey et al.
(Continued)

FOREIGN PATENT DOCUMENTS

CN    103573351 A      2/2014
DE    202014102872 U1  7/2014
(Continued)

OTHER PUBLICATIONS

European Search Report for related Application No. 1621263.1; dated May 22, 2017.
(Continued)

*Primary Examiner* — Walter D. Griffin
*Assistant Examiner* — Jelitza M Perez

(57) ABSTRACT

A pipe mixer for an aftertreatment system is described for mixing of a reductant and exhaust gas. The pipe mixer comprises a hollow body having a first end and a second end, the body surrounding a mixing channel; an injector mount positioned at the first end of the body; perforations provided on the body for entry of exhaust flow into the mixing channel; directional elements positioned on the body for directing exhaust flow towards the injector mount, the directional elements being positioned between the first end and the perforations wherein each directional element comprises an inlet formed on the body for entry of exhaust flow and a guide provided on an internal surface of the body, the guide having an outlet for exit of exhaust flow.

13 Claims, 4 Drawing Sheets

(51) Int. Cl.
*B01D 53/94* (2006.01)
*B01F 3/04* (2006.01)
*B01F 5/04* (2006.01)
*F01N 3/20* (2006.01)
*F01N 13/20* (2010.01)
*B01F 5/00* (2006.01)

(52) U.S. Cl.
CPC ......... *B01F 5/0461* (2013.01); *F01N 3/2066* (2013.01); *F01N 13/20* (2013.01); *B01F 2005/0091* (2013.01); *F01N 2470/04* (2013.01); *F01N 2610/02* (2013.01); *F01N 2610/1453* (2013.01)

(56) References Cited

U.S. PATENT DOCUMENTS

| | | | | |
|---|---|---|---|---|
| 2010/0212301 | A1* | 8/2010 | De Rudder | F01N 3/2066 60/299 |
| 2014/0196442 | A1 | 7/2014 | Katou et al. | |
| 2015/0044103 | A1 | 2/2015 | Sampath et al. | |
| 2016/0265409 | A1 | 9/2016 | Püschel et al. | |
| 2016/0326931 | A1* | 11/2016 | Freeman | F01N 3/2066 |

FOREIGN PATENT DOCUMENTS

| | | |
|---|---|---|
| DE | 102013007714 A1 | 11/2014 |
| EP | 2687697 A1 | 1/2014 |
| EP | 2843306 A1 | 3/2015 |
| EP | 3067529 A1 | 9/2016 |
| GB | 2386845 A | 10/2003 |
| WO | WO 2013/178321 A1 | 12/2013 |

OTHER PUBLICATIONS

International Search Report for related Application No. PCT/EP2017/082097; dated Jan. 18, 2018.

* cited by examiner

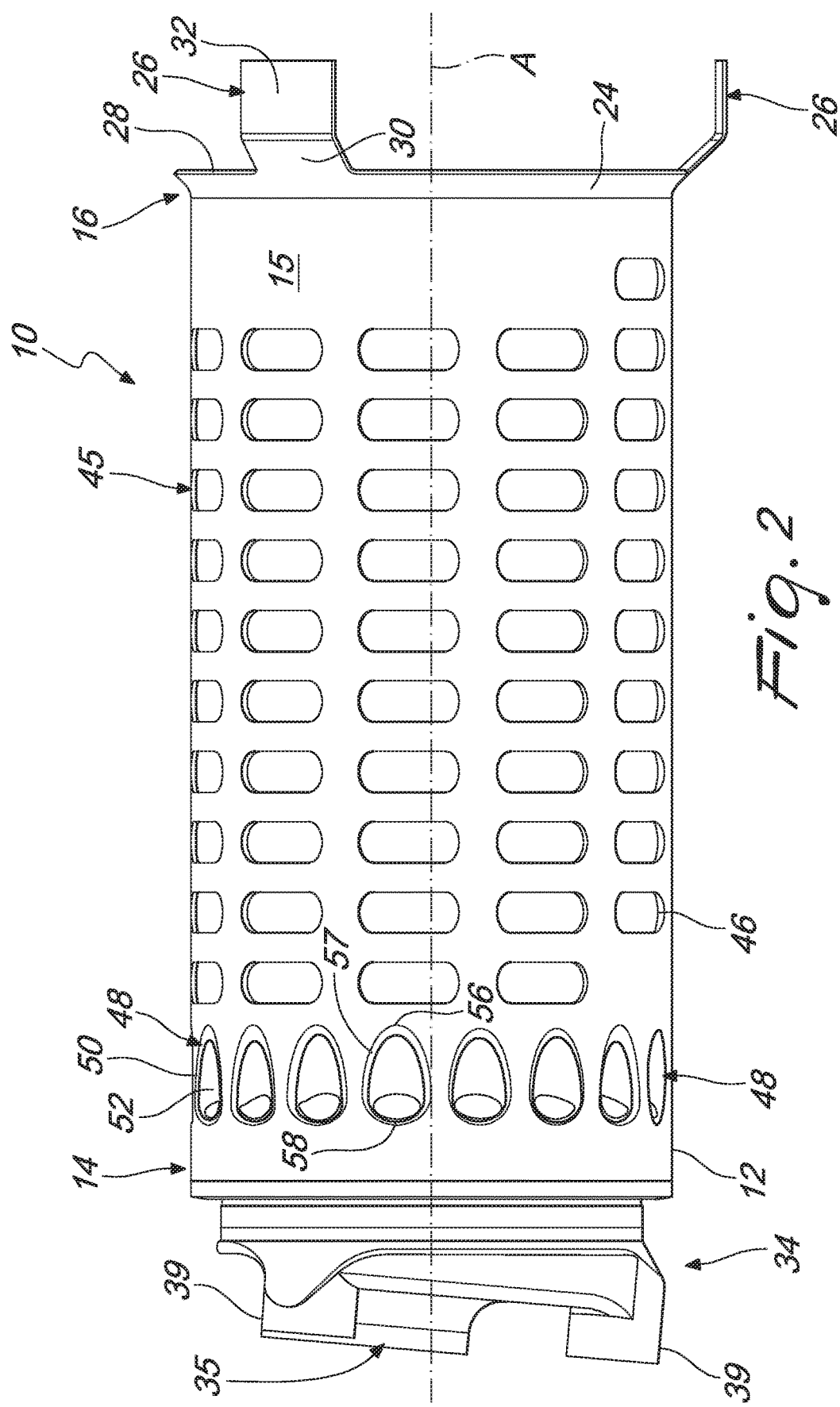

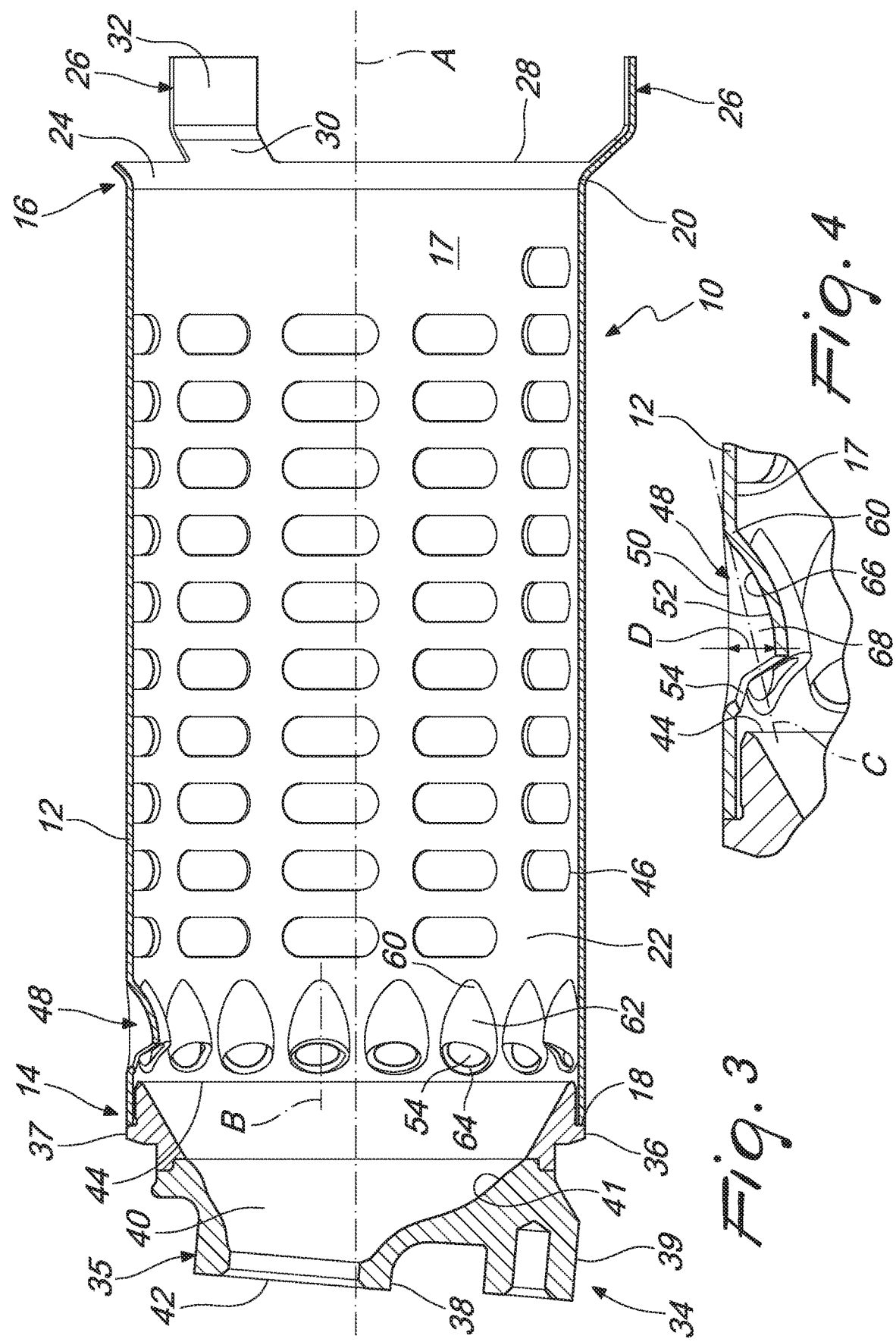

PIPE MIXER FOR AN AFTERTREATMENT SYSTEM

CROSS-REFERENCE TO RELATED APPLICATION

This Application is a 35 USC § 371 US National Stage filing of International Application No. PCT/EP2017/082097 filed on Dec. 7, 2017 which claims priority under the Paris Convention to European Patent Application No. 1621263.1 filed on Dec. 14, 2016.

TECHNICAL FIELD

This disclosure relates to exhaust aftertreatment systems in internal gas combustion engines, in particular, to mixing of a reductant and exhaust in an aftertreatment system and, more particularly, to a pipe mixer for mixing of a reductant and exhaust in the aftertreatment system.

BACKGROUND

Exhaust aftertreatment systems may be provided in vehicles for the purpose of reducing nitrogen oxides (NOx) contained in exhaust gases discharged from the combustion chambers of internal combustion engines. In certain exhaust aftertreatment systems, a reductant may be injected into flow of exhaust. The reductant may be liquid urea that are injected as liquid droplets. Liquid urea may be injected at various positions, such as in the center of a straight segment of an exhaust conduit or at an elbow pipe in the exhaust conduit.

Effective reduction of NOx is dependent on a proper mixing of the urea droplets with the exhaust gas. Accumulation of urea deposits may hinder the proper mixing urea and exhaust gas. Further, spray distribution may be dependent upon the flow condition of the exhaust gas. Increased deposit at the injector tip during low exhaust flow conditions may reduce the spray distribution of the urea droplets. In particular, with in-elbow pipe injection systems, spray distribution variation may be greatly affected by exhaust flow conditions resulting in deposit issues at an elbow bend.

U.S. Pat. No. 8,899,022B2 discloses an exhaust gas aftertreatment device having a bent exhaust pipe, a mixing pipe with a closed end at the exhaust pipe bend and a bell-shaped widened portion in at least partial contact with the exhaust pipe at its opposite end, and a urea nozzle connected to a receptacle in the mixing pipe closed end for injecting an additive into exhaust gases. The exhaust gas flowing into the mixing pipe may flow through the perforations in the mixing pipe jacket. Part of the exhaust gases flowing into the perforations in the pipe jacket leads to a concentration of the exhaust gas flow at the centre mixing pipe.

CN103573351A discloses a mixing device for the aftertreatment of exhaust gases in an exhaust system of an internal combustion engine. The mixing device comprises a housing with an entrance opening having an inlet and an inner tube arranged inside the housing. The inner tube has a mixing region formed therein. A metering device is arranged on an end face of the housing to supply a liquid and/or a liquid-gas mixture. The inner tube, on its lateral surface, is provided with access openings through which the exhaust gases are introduced into the mixing region. Guide members are provided at respective openings. The guide members direct the flow of exhaust into the mixing region.

The present disclosure is directed, at least in part, to improving or overcoming one or more aspects of the prior art system.

BRIEF SUMMARY OF THE INVENTION

The present disclosure describes a pipe mixer for an aftertreatment system. The pipe mixer comprises a hollow body having a first end and a second end, the body surrounding a mixing channel; an injector mount positioned at the first end of the body; perforations provided on the body for entry of exhaust flow into the mixing channel; directional elements positioned on the body for directing exhaust flow towards the injector mount, the directional elements being positioned between the first end and the perforations wherein each directional element comprises an inlet formed on the body for entry of exhaust flow and a guide provided on an internal surface of the body, the guide having an outlet for exit of exhaust flow.

BRIEF DESCRIPTION OF THE DRAWINGS

The foregoing and other features and advantages of the present disclosure will be more fully understood from the following description of various embodiments, when read together with the accompanying drawings, in which:

FIG. 2 is a side view of pipe mixer of FIG. 1;

FIG. 3 is a cross-sectional view of pipe mixer of FIG. 2;

FIG. 4 is a cross-sectional view of a directional element in the pipe mixer of FIG. 2;

DETAILED DESCRIPTION

This disclosure generally relates to a pipe mixer for assembly to an aftertreatment system in an combustion engine. The pipe mixer may improve mixing of a reductant and exhaust.

Figure 1:
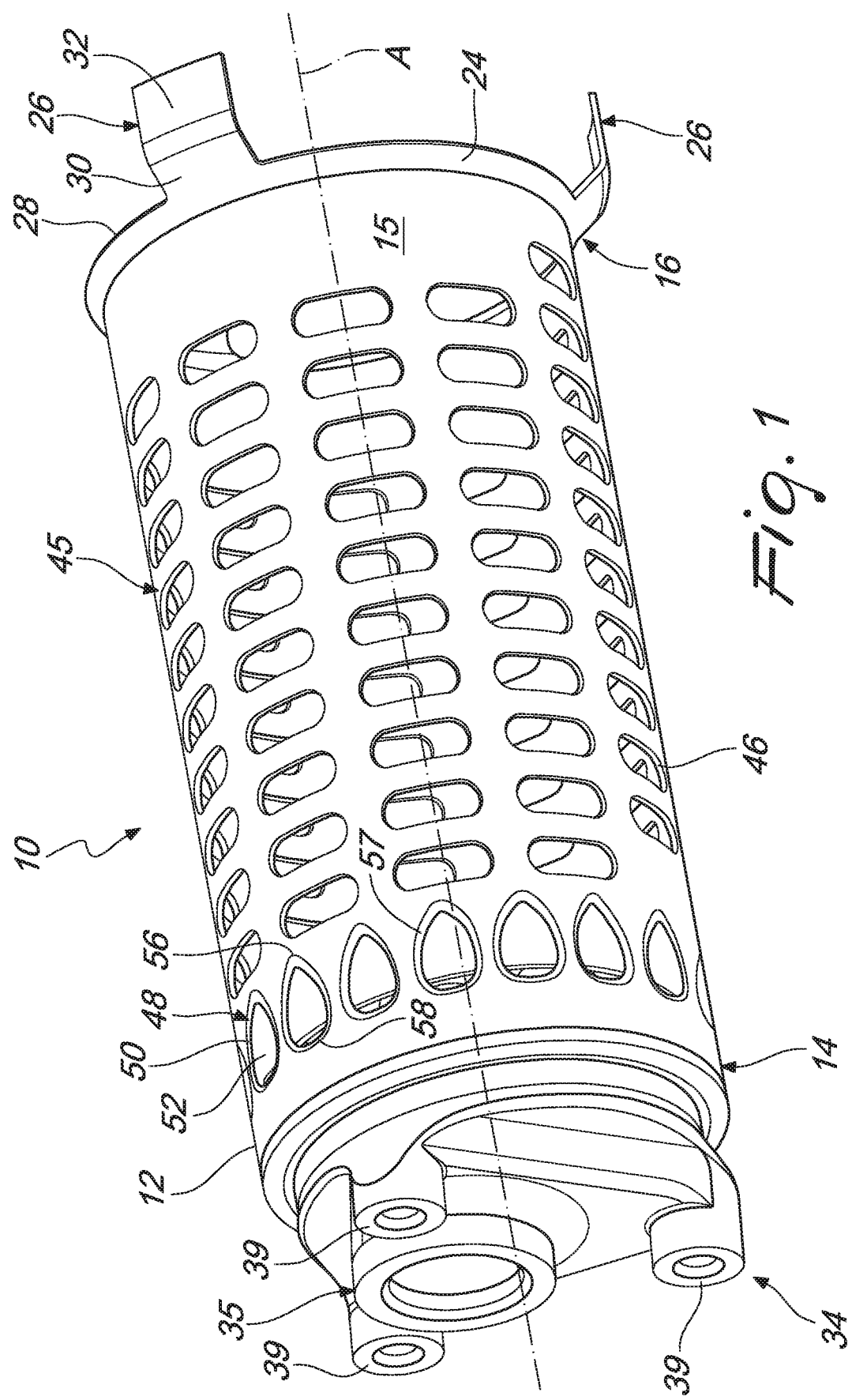
FIG. 1 is an isometric view of a pipe mixer according to the present disclosure.

FIGS. 1 to 3 illustrates a pipe mixer 10. The pipe mixer 10 may be elongated and may have a longitudinal axis A. The pipe mixer 10 may have a hollow body 12. Body 12 may have a first end 14 and a second end 16. Body 12 may have an external surface 15 and internal surface 17. In an embodiment, the body 12 may be cylindrical in shape.

With reference to FIG. 3, the first end 14 may have a first opening 18. In an embodiment, the first opening 18 may be circular. The second end 16 may have a second opening 20. In an embodiment, the second opening 20 may be circular. The planes of the first and second openings 18, 20 may be perpendicular to the longitudinal axis A. Longitudinal axis A may extend through the respective centre points of first and second openings 18, 20. Planes of the first and second openings 18, 20 may be mutually parallel.

Body 12 may have a hollow bore that forms a mixing channel 22. Exhaust gases may be mixed with the reductant in the mixing channel 22. The body 12 may surround the mixing channel 22. Mixing channel 22 may extend between the first and second openings 18, 20. Mixing channel 22 may be substantially perpendicular to the respective planes of the first and second openings 18, 20.

With reference to FIGS. 1 and 2, pipe mixer 10 may have a skirt 24. Skirt 24 may be positioned at the second end 16 of body 12. Skirt 24 may encircle the second opening 20. Skirt 24 may extend from body 12. Skirt 24 may be inclined relative to the body 12. Skirt 24 may be inclined away from longitudinal axis A. Skirt 24 may have a free edge 28. Free edge 28 may extend along the distal portion of the skirt 24.

Pipe mixer 10 may have a leg 26. Leg 26 may extend from the skirt 24. Leg 26 may extend from the free edge 28 of the skirt 24. Leg 26 may have a first leg portion 30 and a second leg portion 32. First leg portion 30 may connect the second leg portion 32 to the skirt 24. In an embodiment, pipe mixer 10 may have at least 3 legs 26. The legs 26 may be mutually angularly spaced on the skirt 24.

First leg portion 30 may be substantially parallel to the skirt 24. In an embodiment, first leg portion 30 may be level with the skirt 24. First leg portion 30 may be inclined relative to the longitudinal axis A to the same magnitude as the skirt 24 is inclined relative to the longitudinal axis A.

Second leg portion 32 may be substantially inclined relative to the first leg portion 30. Second leg portion 32 may be substantially inclined relative to the skirt 24. Second leg portion 32 may be substantially parallel to the body 12. Second leg portion 32 may be substantially parallel to the longitudinal axis A. Second leg portion 32 may be spaced further from the longitudinal axis A relative to the skirt 24. Second leg portion 32 may be spaced further from the longitudinal axis A relative to the external surface 15 of body 12.

With reference to FIGS. 1 and 2, the pipe mixer 10 may have an injector mount 34. The injector mount 34 may be positioned at the first end 14 of the body 12. With reference to FIG. 3, the injector mount 34 may be inserted into the body 12 at the first opening 18. Injector mount 34 may have a base 36 and an apex 38. Injector mount 34 may be substantially frustoconical in shape. Base 36 may have a greater diameter relative to the apex 38.

Base 36 may be dimensioned to fit into the first opening 18. Base 36 may have a shoulder 37 having a diameter greater than the diameter of the first opening 18. Shoulder 37 may extend over the first opening 18. Shoulder 37 may abut the edge of the first end 14 to restrict the insertion of the injector mount 34 into the first opening 18. In an embodiment, the injector mount 34 may be but welded at the first opening 18. Shoulder 37 may be welded at the first opening 18.

With reference to FIG. 3, the injector mount 34 may be hollow. Injector mount 34 may have an injection chamber 40. A reductant may be injected into the pipe mixer 10 through the injection chamber 40. The injection chamber 40 may be continuous with the mixing channel 22. The injected reductant may move from the injection chamber 40 into the mixing channel 22. Injection chamber 40 may be substantially frustoconical in shape.

The internal wall 41 of the injection chamber 40 may be inclined from the base 36 to the apex 38. The internal wall 41 of the injection chamber 40 may be inclined relative to the internal surface 17 of the body 12.

Injector mount 34 may have a first aperture 42 and a second aperture 44. First aperture 42 may be positioned at the apex 38. First aperture 42 may permit entry of the injector tip of a reductant injector (not shown) for the injection of the reductant.

Second aperture 44 may be positioned at the base 36. Second aperture 44 may be spaced from the first opening 18. Second aperture 44 may be disposed partway into the mixing channel 22. Second aperture 44 may connect the injection chamber 40 to the mixing channel 22. Second aperture 44 may be concentric with the mixing channel 22. Longitudinal axis A may extend through the centre point of the second aperture 44.

At the apex 38, the injector mount 34 may have an injector mount 35. Injector mount 35 may permit the mounting of the reductant injector (not shown). Injector mount 35 may comprise the first aperture 42. The injector mount 35 may further comprise bolt holes 39 for connection with the reductant injector.

With reference to FIGS. 1 to 3, the pipe mixer 10 may have perforations 46. The perforations 46 may be provided on the body 12 for entry of exhaust flow into the mixing channel 22. Exhaust may flow into the pipe mixer 10 through the perforations 46. Each perforation 46 may extend between the external surface 15 to the internal surface 17.

The perforations 46 may be arranged on body 12 in an array 45. The array 45 may be positioned between the first and second ends 14, 16. The array 45 may be centrally disposed on body 12 between the first and second ends 14, 16. Opposite ends of the array 45 may be spaced from the first and second ends 14, 16. The perforations 46 at opposite ends the array 45 may be spaced from the first and second ends 14, 16.

The array 45 may comprise perforations 46 that are longitudinally arranged on body 12 in columns. The columns of perforations 46 may be substantially parallel to the longitudinal axis A. Columns of perforations 46 may be juxtaposed around body 12.

With reference to FIGS. 1 to 3, the pipe mixer 10 may comprise directional elements 48. The directional elements 48 may be positioned on the body 12 for directing exhaust flow towards the injector mount 34. Directional elements 48 may be radially arranged on the body 12. Directional elements 48 may be mutually angularly spaced on the body 12.

The directional elements 48 may be positioned in series circumferentially around the body 12. In a further embodiment, the directional elements 48 may be concentrically arranged relative to the injector mount 34.

Directional elements 48 may be positioned between the first end 14 and the perforations 46. Directional elements 48 may be positioned between the first end 14 and an end row of perforations 46 in the array 45. In an embodiment, directional elements 48 may be positioned adjacent the first end 14. In a further embodiment, the directional elements 48 may be radially inwardly protruding.

With reference to FIG. 3, the directional elements 48 may be positioned adjacent the second aperture 44. The second aperture 44 may be disposed between the directional elements 48 and the first opening 18. In a further embodiment, the directional elements 48 may be concentrically arranged relative to the second aperture 44.

With reference to FIG. 4, each directional element 48 may comprise an inlet 50, a guide 52 and an outlet 54. The inlet 50 may be formed on the body 12 for entry of exhaust flow. Exhaust may flow into the directional element 48 through the inlet 50. The guide 52 may be provided on the internal surface 17 of the body 12. Guide 52 may comprise the outlet 54. Outlet 54 may enable exit of exhaust flow. Guide 52 may guide the exhaust flow from the inlet 50 towards the outlet 54.

With reference to FIGS. 1 and 2, the inlet 50 may have a pointed apex 56 and a curved base 58. Inlet 50 may have a substantially teardrop shape. Inlet 50 may be axially orientated relative to the longitudinal axis A. The pointed apex 56 may face the perforations 46 and the curved base 58 may face the first end 14. Pointed apex 56 and curved base 58 may aid in the aerodynamic flow of the exhaust into the directional element 48. Inlet 50 may have a bevelled surface 57 from the external surface 15 of the body 12 to the internal surface 17 of the body 12. Bevelled surface 57 may reduce the resistance of the exhaust flow into the directional element 48.

With reference to FIG. 3, the guide 52 may be configured to direct exhaust flow along the internal wall 41 of the injector mount 34. The outlet 54 may be positioned to direct exhaust flow along the internal wall 41 of the injector mount 34. In an embodiment, guide 52 may be configured to divert the exhaust flow 25 to 35 degrees relative to the internal surface 17 of the body. Preferably, guide 52 may be configured to divert the exhaust flow 30 degrees relative to the internal surface 17 of the body 12.

The guide 52 may elongated along a linear direction. Guide 52 may have a central axis B substantially parallel to the longitudinal axis A of the body 12. The central axes B of mutually adjacent directional elements 48 may be substantially parallel.

The guide 52 may have a substantially arcuate shape extending from the internal surface 17 of the body 12 and over the inlet 50. In an embodiment, guide 52 may have a truncated prolate shape. The outlet 54 may be positioned at the truncated point of the guide 52.

The guide 52 has a closed end 60. The closed end 60 may be positioned opposite to the outlet 54. The closed end 60 may face the perforations 46. Guide may have a sidewall 62. Sidewall 62 may extend from the closed end 60 to the outlet 54. Sidewall 62 may have a rim 64 that surrounds the outlet 54. Sidewall 62 may be flared from the closed end 60 to the outlet 54.

With reference to FIG. 4, the guide 52 may have a curved structure extending over the inlet 50. In an embodiment, a distance D from the plane of the inlet 50 to an inner surface 66 of the guide 52 may increase from the closed end 60 to the outlet 54. Inner surface 66 may border the inlet 50. Inner surface 66 may extend from the closed end 60 to the rim 64.

The guide 52 may surround a passage 68. Inner surface 66 may encompass the passage 66 that extends between the inlet 50 and the outlet 54. The passage 68 may have a centreline C inclined relative to the longitudinal axis A of the body 12.

Figure 5:
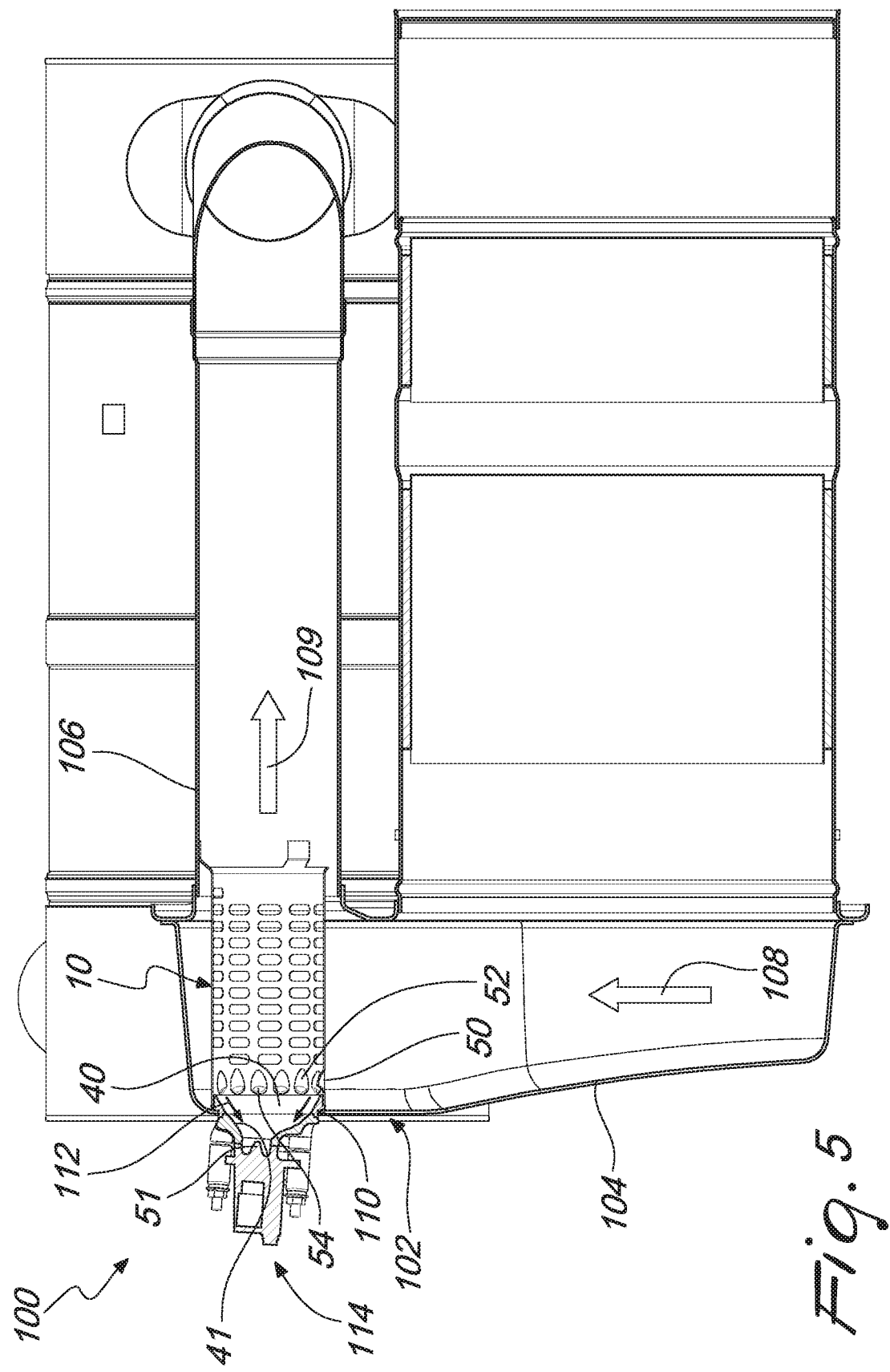
FIG. 5 is a cross-sectional view of a aftertreatment system comprising the pipe mixer FIG. 1.

FIG. 5 illustrates an aftertreatment system 100. The aftertreatment system 100 may comprise an exhaust conduit 102 having an inlet path 104 and an outlet path 106. The exhaust conduit 102 may convey exhaust flow through the aftertreatment system. The inlet path 104 may convey a first exhaust flow 108 away from an engine (not shown). The outlet path 106 may convey a second exhaust flow 109 to the exhaust pipe (not shown).

In an embodiment, the exhaust conduit 102 may be angled. The inlet path 104 may be inclined relative to the outlet path 106. The inlet path 104 may be substantially perpendicular to the outlet path 106. In a further embodiment, the exhaust conduit 102 may be an elbow pipe.

The aftertreatment system 100 may comprise an injector opening 110 for injection of a reductant. The injector opening 110 may be positioned between the inlet path 104 and the outlet path 106. The injector opening 110 may be positioned at the junction of inlet path 104 and the outlet path 106.

The pipe mixer 10 may be positioned at the injector opening 110. The injector mount 34 of the piper mixer 10 may be positioned at the injector opening 110. The injector mount 35 may be disposed external to the exhaust conduit 102. Injector mount 34 may be inserted at the injector opening 110. Injector mount 35 may be inserted through the injector opening 110 to be disposed external to the exhaust conduit 102.

The body 12 of the piper mixer 10 may be substantially parallel to the outlet path 106 and substantially transverse to the inlet path 104. The pipe mixer 10 may extend from the injector opening 110 into the outlet path 106. Respective planes of perforations 46 may be substantially transverse to the inlet path 104. Array 45 may be substantially transverse to the inlet path 104.

Respective planes of the inlets 50 may be substantially transverse to the inlet path 104. Guides 52 may be substantially transverse to the inlet path 104. Respective central axes B of guides 52 may be substantially transverse to the inlet path 104. Respective planes of the outlets 54 may be substantially parallel to the inlet path 104.

Body 12 may be substantially parallel to the second exhaust flow 109 and substantially transverse to the first exhaust flow 108. First exhaust flow 108 may arrive at the pipe mixer 10 substantially perpendicular to the body 12 so as to move through the perforations 46 into the mixing channel 22.

First exhaust flow 108 may move through the directional elements 48 so as to be diverted towards the injector mount 34. The diverted flow 112 may move through the injector chamber 40. Diverted flow 112 may move along the internal wall 41 of the injector mount 34. Diverted flow 112 may move towards the first aperture 42. Diverted flow 112 may flow towards the centre of the injector chamber 40. Diverted flow 112 may move towards the injector tip 51 of the reductant injector 114. The injector tip 51 may be inserted through the first aperture 42.

The reductant may be injected substantially parallel to the longitudinal axis A of the pipe mixer 10. In an embodiment, the reductant may be urea. The reductant may mix with the exhaust gas in the mixing channel 22 may be exit the pipe mixer 10 through the second opening 20 as the second exhaust flow 109.

The skilled person would appreciate that foregoing embodiments may be modified or combined to obtain the pipe mixer 10 and the aftertreatment system 100 of the present disclosure.

INDUSTRIAL APPLICABILITY

This disclosure describes a pipe mixer 10 for assisting in the mixing of a reductant and exhaust gas. The piper mixer 10 may direct flow of a portion of exhaust gas towards the injector chamber 40. The diverted flow 112 of exhaust may promote mixing of the reductant with the exhaust thereby reducing the deposition of the reductant on the internal wall 41 of the injector chamber 40. The diverted flow 112 may increase flow velocity within the injector mount 34. At times, the reductant may tend to dribble towards the end of the injection process. The increased flow velocity may aid in the prevention of reductant being deposited on the internal wall 41 of the injector mount 34.

The diverted flow 112 may further aid in the prevention of deposition through the flow path of the diverted flow 112. The exhaust flow may be diverted so as to flow along the internal wall 41 of the injector mount 34. The diverted flow 112 may arrive at the injector tip from the surface of the internal wall 41 and may carry the injected reductant away from the injector tip 51 to the mixing channel 22 in the body 12 of the pipe mixer 10 thereby improving spray distribution of the reductant.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

Where technical features mentioned in any claim are followed by reference signs, the reference signs have been included for the sole purpose of increasing the intelligibility of the claims and accordingly, neither the reference signs nor their absence have any limiting effect on the technical features as described above or on the scope of any claim elements.

One skilled in the art will realise the disclosure may be embodied in other specific forms without departing from the disclosure or essential characteristics thereof. The foregoing embodiments are therefore to be considered in all respects illustrative rather than limiting of the disclosure described herein. Scope of the invention is thus indicated by the appended claims, rather than the foregoing description, and all changes that come within the meaning and range of equivalence of the claims are therefore intended to be embraced therein.

The invention claimed is:

1. A pipe mixer for an aftertreatment system, the pipe mixer comprising:
    a hollow body having a first end and a second end, the body surrounding a mixing channel;
    an injector mount positioned at the first end of the body, the injector mount defining an injection chamber having a first aperture and a second aperture, the injector mount including a base, an apex and an inclined internal wall between the base and the apex, the first aperture disposed at the apex and configured to receive an injector tip of a reductant injector, the second aperture disposed at the base and in fluid communication with the first end of the body;
    perforations provided on the body for entry of exhaust flow into the mixing channel;
    directional elements positioned on the body for to directing exhaust flow along the inclined internal wall towards the injector mount first aperture, the directional elements being positioned between the first end and the perforations wherein each directional element comprises an inlet formed on the body for entry of exhaust flow and a guide provided on an internal surface of the body, the guide having an outlet for exit of exhaust flow, the outlet oriented to face the inclined internal wall and the first aperture.

2. The pipe mixer of claim 1, wherein the guide is elongated along a linear direction, the guide having a central axis substantially parallel to the longitudinal axis of the body.

3. The pipe mixer of claim 2, wherein the guide has a closed end opposite to the outlet, a sidewall of the guide is flared from the closed end to the outlet.

4. The pipe mixer of claim 3, wherein the distance from a plane of the inlet to an inner surface of the guide increases from the closed end to the outlet.

5. The pipe mixer of claim 2, wherein the guide surrounds a passage for exhaust flow, the passage having a centreline inclined relative to the longitudinal axis of the body.

6. The pipe mixer of claim 2, wherein the guide has a truncated prolate shape.

7. The pipe mixer of claim 2, wherein the directional elements are positioned in a series circumferentially around the body.

8. The pipe mixer of claim 7, wherein the central axes of mutually adjacent directional elements are substantially parallel.

9. An aftertreatment system comprising:
    an exhaust conduit having an inlet path and an outlet path;
    an injector opening for injection of a reductant, the injector opening positioned between the inlet path and the outlet path; and
    the pipe mixer of claim 1, the pipe mixer being positioned at the injector opening.

10. The aftertreatment system of claim 9, wherein the injector mount of the pipe mixer is positioned through the injector opening such that the injector mount is disposed external to the exhaust conduit.

11. The aftertreatment system of claim 9, wherein the inlet path is substantially perpendicular to the outlet path and wherein the body of the pipe mixer is substantially parallel to the outlet path and substantially transverse to the inlet path.

12. The aftertreatment system of claim 9, wherein respective planes of inlets and respective central axes of the guides are transverse to the inlet path.

13. The aftertreatment system of claim 9, wherein respective planes of outlets of the guides are parallel to the inlet path.

* * * * *